US012773701B2

(12) United States Patent
Mou et al.

(10) Patent No.: US 12,773,701 B2
(45) Date of Patent: Oct. 27, 2026

(54) SCREW CONVEYOR HAVING AUXILIARY BLADES AND SCREW DISCHARGE DECANTER CENTRIFUGE

(71) Applicant: Juneng Machinery (China) CO., LTD, Nanjing (CN)

(72) Inventors: Yuhui Mou, Nanjing (CN); Fujun Mou, Nanjing (CN); Housheng Zhang, Nanjing (CN); Bin Wang, Nanjing (CN)

(73) Assignee: Juneng Machinery (China) CO., LTD, Nanjing (CN)

( * ) Notice: Subject to any disclaimer, the term of this patent is extended or adjusted under 35 U.S.C. 154(b) by 505 days.

(21) Appl. No.: 18/272,530

(22) PCT Filed: Jan. 18, 2022

(86) PCT No.: PCT/CN2022/072492

§ 371 (c)(1),
(2) Date: Jul. 14, 2023

(87) PCT Pub. No.: WO2022/156661

PCT Pub. Date: Jul. 28, 2022

(65) Prior Publication Data

US 2024/0075483 A1 Mar. 7, 2024

(30) Foreign Application Priority Data

Jan. 21, 2021 (CN) ......................... 202110078384.9

(51) Int. Cl.
*B04B 1/20* (2006.01)

(52) U.S. Cl.
CPC ........ *B04B 1/20* (2013.01); *B04B 2001/2041* (2013.01); *B04B 2001/205* (2013.01)

(58) Field of Classification Search
CPC .............. B04B 1/20; B04B 2001/2041; B04B 2001/205
USPC ............ 494/53–54, 56–57; 210/380.1, 380.3
See application file for complete search history.

(56) References Cited

U.S. PATENT DOCUMENTS 832,191 A * 10/1906 Holzer ...................... B04B 1/20 494/54
4,617,010 A * 10/1986 Epper ....................... B04B 1/20 494/52
6,908,423 B2 * 6/2005 Hruschka .................. B04B 1/20 494/901

(Continued)

FOREIGN PATENT DOCUMENTS

CN 108067355 A * 5/2018 ............... B04B 1/20
CN 108067356 A * 5/2018 ............... B04B 1/20

(Continued)

*Primary Examiner* — Charles Cooley
(74) *Attorney, Agent, or Firm* — iPA & iPM

(57) ABSTRACT

A screw conveyor having auxiliary blades (10), and a screw discharge decanter centrifuge. A hollow internal cylinder (4) is provided with a tapered section (11) and a straight section (7). Screw blades (6) are provided on the periphery of the inner cylinder (4), and several auxiliary blades (10) are provided between the screw blades (6), wherein the width of the auxiliary blades (10) is smaller than the pitch of the screw blades (6). Two adjacent auxiliary blades (10) are arranged in a staggered manner in a screw passage space to form a serpentine flow passage (15).

9 Claims, 9 Drawing Sheets

(56) References Cited

U.S. PATENT DOCUMENTS

| | | | | |
|---|---|---|---|---|
| 7,549,957 | B2 * | 6/2009 | Hruschka | B04B 1/20<br>494/901 |
| 2023/0149950 | A1 * | 5/2023 | Maxwell | B04B 1/20<br>210/787 |
| 2024/0075483 | A1 * | 3/2024 | Mou | B04B 1/20 |

FOREIGN PATENT DOCUMENTS

| | | | | | |
|---|---|---|---|---|---|
| CN | 112827665 | A | * | 5/2021 | B04B 1/20 |
| DE | 102005061461 | A1 | * | 7/2007 | B04B 1/20 |
| EP | 1364717 | A2 | * | 11/2003 | A23N 1/00 |
| JP | 57194061 | A | * | 11/1982 | |
| KR | 20130123006 | A | * | 11/2013 | B04B 1/20 |
| KR | 101490746 | B1 | * | 2/2015 | B04B 1/20 |
| KR | 102095006 | B1 | * | 3/2020 | C02F 11/125 |
| WO | WO-9723295 | A1 | * | 7/1997 | B04B 1/20 |
| WO | WO-0238278 | A1 | * | 5/2002 | B04B 1/20 |
| WO | WO-2022096734 | A1 | * | 5/2022 | B04B 1/20 |
| WO | WO-2022156661 | A1 | * | 7/2022 | B04B 1/20 |

* cited by examiner

SCREW CONVEYOR HAVING AUXILIARY BLADES AND SCREW DISCHARGE DECANTER CENTRIFUGE

TECHNICAL FIELD

The invention relates to the technical field of solid-liquid separation, in particular to a screw conveyor having auxiliary blades and screw discharge decanter centrifuge.

BACKGROUND TECHNOLOGY

The screw discharge decanter centrifuge includes vertical and horizontal screw discharge decanter centrifuge, which is a kind of high-efficiency centrifuge equipment for solid-liquid separation, and it can be used in the centrifuge treatment process of industrial and civil solid-liquid separation. Horizontal screw discharge decanter centrifuge is referred to as horizontal screw centrifuge. Compared with belt filter press and plate and frame filter press, horizontal screw centrifuge has been widely used in the industrial field due to its own characteristics of large processing capacity, automatic operation and good dehydration effect. FIG. 1 shows the structure of a conventional horizontal screw centrifuge. The rotary drum comprises a small end of a tapered section 11 and a large end of a straight section 7; the small end and the large end are respectively fixedly connected by a small end cover 2 and a large end cover 8. The feed pipe 1 is internally communicated with the hollow internal cylinder 4 of the screw conveyor through the small end cover 2 or enters from the large end of the rotary drum. A screw blade 6 is fixed on the outer periphery of the inner cylinder 4. A discharge hole 3 is arranged on the inner cylinder 4 near the feed pipe 1. A solid phase outlet 12 is arranged at the lower part of the small end of the outer cylinder 5. An overflow port 9 is arranged on the large end cover 8, and the large end cover 8 is fixedly connected with the outer cylinder 5. The rotary drum and the screw conveyor are controlled by a differential mechanism to rotate at a differential speed. During operation, the suspended liquid to be separated is continuously transported to the hollow internal cylinder 4 of the screw conveyor through the feed pipe 1 and enters between the outer cylinder 5 and the inner cylinder 4 which rotates at high speed through the discharge hole 3 of the screw conveyor. Under the action of centrifugal force, the solid-phase particles quickly settle on the inner wall of the outer cylinder. The rotary drum and the screw conveyor rotate in the same direction at a differential speed. The screw conveyor pushes the solid-phase particle sediment to the drying area at the small end of the rotary drum. After bidirectional extrusion by the thrust force of the screw conveyor and the centrifugal force of the sediment, the sediment is further squeezed and dehydrated and discharged from the solid-phase outlet 12 of the small end of the rotary drum, while the separated clear liquid moves to the large end of the rotary drum and is finally discharged from the overflow port 9 of the large end of the rotary drum. The screw conveyor can continuously deliver sediment to outlet 12 and discharge, its structure, material and parameters can not only affect the production capacity and service life of the horizontal screw centrifuge, but also directly affect the efficiency and separation effect of the sediment discharge. In actual work, the treatment effect of existing horizontal screw centrifuge in the treatment of suspension which is difficult in solid-liquid separation is relatively poor, small solid particles are difficult to be separated, while they will be discharged with the light phase, resulting in a high solid content of the light phase, therefore, a more precise centrifuge must also be set up in the post treatment process to carry out the centrifugal separation of the light liquid again.

A Chinese invention patent 2018210710072 discloses a horizontal three-phase combined centrifugal separator, which is welded with a screw inclined plate separator on the outer wall of the screw ejector; the screw inclined plate separator and the outer wall of the screw ejector are generally provided with screw ejector sheets, and they simultaneously overcome the defects of the disc centrifuge and the horizontal screw centrifuge, which can carry out three-phase or two-phase separation, reduce the embarrassment of multiple centrifuge equipment being used in the same process at the same time, and it is not only almost close to the clarity effect of separating the liquid by the disc centrifuge separator but also it is completely equal to that of the horizontal screw centrifuge in treating solids, and the adjustment operation of the separation effect is simpler. However, the dense and numerous inclined plates in this design seriously increase the weight of the rotor. At the same time, the screw blades are arranged on the periphery of the screw inclined plate. Therefore, the method of spot welding can only be adopted at the intersection, resulting in poor connection strength of the blades, and it is difficult to bear the centrifugal load of the high-speed rotation of the horizontal screw centrifuge. In this structure, the material will be directly passed through the screw inclined plate from the feed end to the light liquid outlet along the screw inclined plate, forming a short circuit, which seriously affects the separation effect of materials.

CONTENT OF THE INVENTION

Aiming at the disadvantages of poor separation effect and high solid content in the light phase which shall be filtered or separated again in the post-treatment process during the treatment of suspension liquid that is difficult in solid-liquid separation by existing equipment, the applicant provides a screw conveyor having auxiliary blades and screw discharge decanter centrifuge with reasonable structure, which enhances the processing capacity and separation efficiency of the equipment for the suspension which is difficult to separate from solid and liquid by increasing the equivalent settling area, separating length and increasing the speed, so as to obtain the light phase with low solid content, and it can also save the required space of the equipment and reduce the investment and operation cost.

The technical scheme and beneficial effects adopted by the invention are as follows:

A screw conveyor having auxiliary blades is provided with a tapered section and a straight section in a hollow internal cylinder; a feed hole is arranged on the pipe wall near the tapered section; a screw blade is arranged on the outer periphery of the inner cylinder; a plurality of auxiliary blades are arranged between the screw blades; the width of the auxiliary blades is smaller than the pitch of the screw blades; and two adjacent auxiliary blades are staggered in the screw passage space to form a tortuous flow path. By adding auxiliary blades between the screw blades, the auxiliary blades rotate together with the inner cylinder, the suspension entering the screw conveyor is separated from the liquid phase under the action of a huge centrifugal force field. In addition, the existence of the auxiliary blades changes the original way that only the screw blades drive the liquid to rotate, while the auxiliary blades drive the suspension from the discharge hole into the inner and outer cylinders to obtain the centrifugal force and rotation speed immediately, thereby accelerating the separation of the solid and liquid phases and improving the separation efficiency. At the same time, the auxiliary blades also increase the equivalent settling area. According to the formula of separation factor Fr=rω2/g, the speed increase and area increase can significantly increase the separation factor Fr and achieve better separation effect. The invention enhances the processing capacity and separation efficiency of the suspension which is difficult to separate from solid and liquid by modifying the existing horizontal screw centrifuge, with the advantages of low cost and saving production operation expenses.

As a further improvement of the above technical scheme:

The root of the auxiliary blade is welded on the outer peripheral surface of the inner cylinder; one side is welded with the screw blade at one side of the screw passage; the other side is a certain distance t from the screw blade at the other side of the screw passage.

The distance t is 20% to 80% of the screw pitch p.

The auxiliary blades are planar straight blades or curved blades.

The curved convex direction of the curved surface of the curved surface auxiliary blade is consistent with the rotation direction of the rotary drum. When the curved blade is selected, the auxiliary blade has a certain bending radian, and the curved convex direction of the curved surface is the same as the rotating direction of the rotary drum, that is, the heavy-phase particles in the suspension will move outward along the convex surface of the curved blade, so that the centrifugal force can be effectively increased and the heavy-phase particles will be settled easily.

The included angle α between the auxiliary blade and the central axis of the rotary drum is 0 to 45°; or the included angle β between the auxiliary blade and the diameter of the rotary drum is 0 to 90°.

The auxiliary blade is arranged in the screw passage behind the discharge hole, which can reduce the conveying resistance of the drying zone of the tapered section of rotary drum and facilitate the discharge of solid-phase materials.

A plurality of the auxiliary blades are evenly distributed in each screw pitch; the adjacent two blades are arranged in parallel or staggered; the side welding positions of the two auxiliary blades on both sides of the screw blades are staggered. The staggered arrangement of two adjacent blades can improve the efficiency of solid ejecting and avoid dead angle or accumulation. Therefore, the staggered auxiliary blades arranged in the screw channel of the invention form a wave-shaped channel. When the separation liquid flows through the channel, the separation liquid is blocked by the auxiliary blades, the flow velocity is reduced and the flow velocity is continuously forced to turn, as a result, the separation path length of the suspension liquid is prolonged, the settling distance and residence time of the suspension liquid to be separated in the rotary drum are increased, the equivalent settling area is also increased under the condition that the diameter, rotation speed and length-diameter ratio of the rotary drum are the same, the settling distance of the particles is shortened and the flow velocity of the suspension liquid is increased, so that the solid particles can be fully separated from the liquid phase and settled, and thus the clear liquid with higher purity can be obtained. In addition, the filtering treatment of the solid particles is unnecessary in the latter process, and the separation effect is effectively improved.

The height of the auxiliary blade is not higher than that of the screw blade, while the height is equal or the height increases sequentially from the solid phase end to the liquid phase end. When the height of the auxiliary blade is flush with the height of the screw blade, the auxiliary blade can assist in scraping the solid particles on the inner wall of the outer drum, and assist the screw blade pushing the solid particles towards the drying area at the small end of the rotary drum. When the height of the auxiliary blade increases sequentially from the solid phase end to the liquid phase end, the auxiliary blade can assist the screw blade to push the solid phase particles to the solid phase end.

A screw discharge decanter centrifuge, which is provided with a screw conveyor having auxiliary blades in the outer cylinder.

ILLUSTRATION WITH PICTURES

In the FIG.: 1. Feed pipe; 2. Small end cover; 3. Discharge hole; 4. Inner cylinder. 5. Outer cylinder; 6. Screw blades; 7. Straight section; 8. Large end cover; 9. Overflow port; 10. Auxiliary blades; 11. Tapered section; 12. Solid phase outlet; 13. The first gap; 14. The second gap; 15. Flow passage.

SPECIFIC IMPLEMENTATION

Specific implementation of the invention will be described below in conjunction with the accompanying drawings.

Embodiment 1

Figure 1:
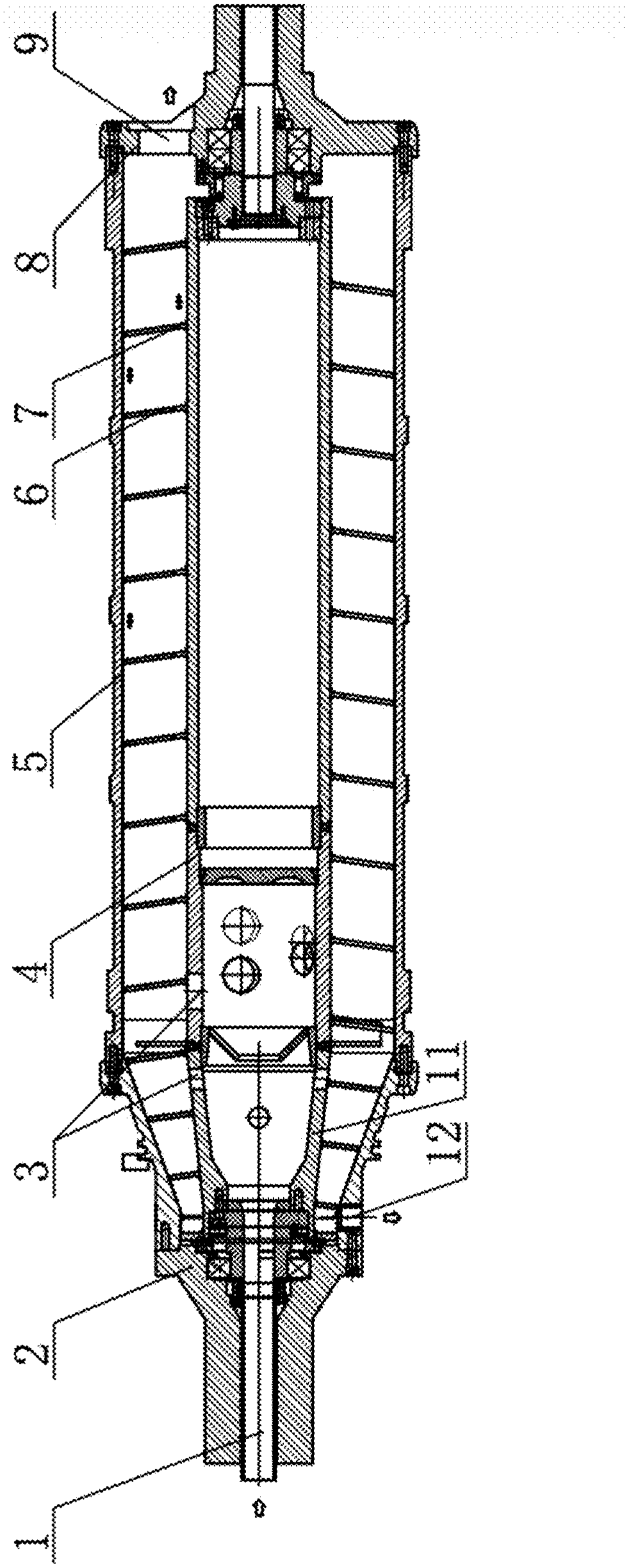
Fig. 1 (Prior Art)
FIG. 1 (Prior Art) is a schematic diagram of the existing horizontal screw centrifuge.
Figure 2:
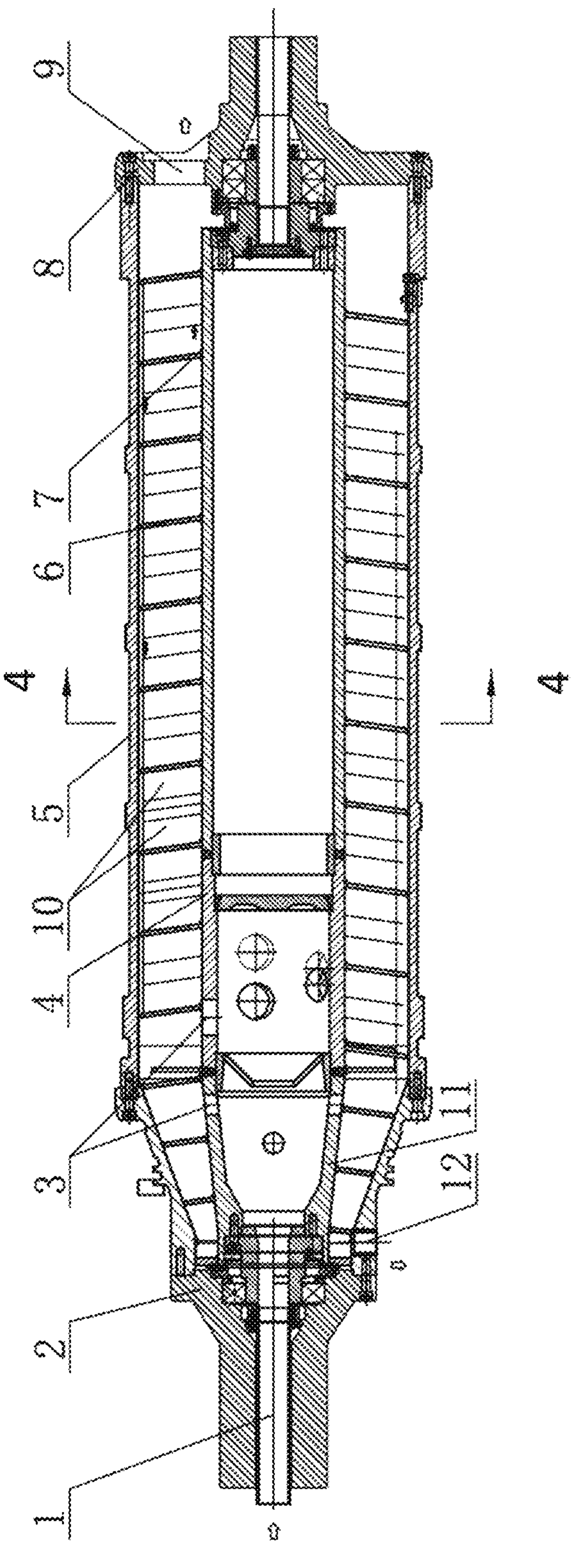
FIG. 2 is a schematic diagram of the structure of a horizontal screw centrifuge using the present invention.
Figure 3:
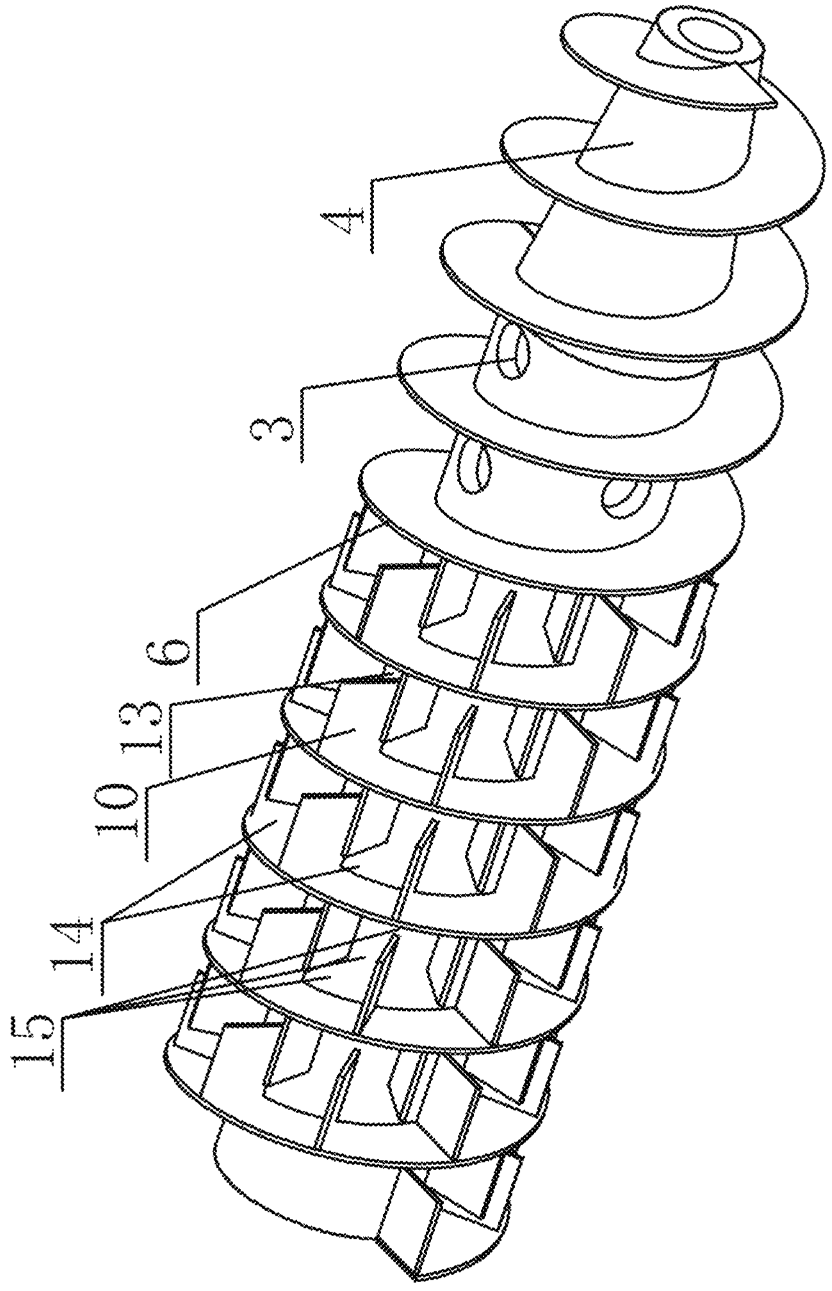
FIG. 3 is a perspective view of the screw conveyor of the present invention.
Figure 4:
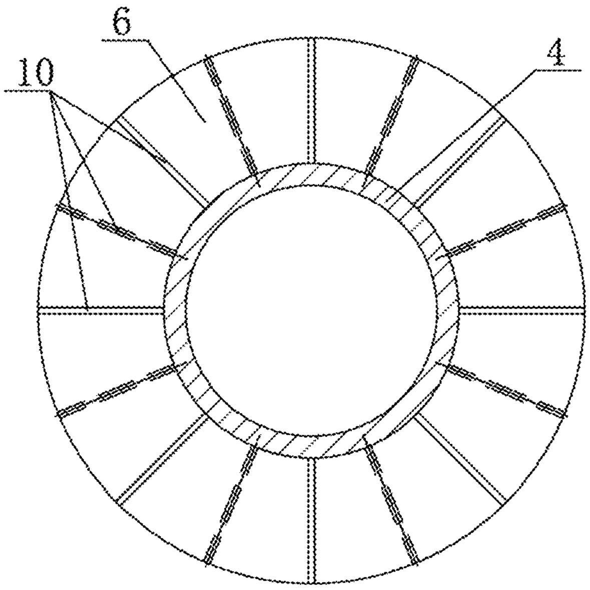
FIG. 4 is a cross-sectional view of the screw conveyer along line 4-4 of FIG. 2.

As shown in FIGS. 3 and 4, the screw conveyor having auxiliary blades of the invention is provided with a plurality of auxiliary blades 10 between the screw blades 6 of the conventional screw conveyor, the width of the auxiliary blades 10 is smaller than the pitch of the screw blades 6, and the adjacent two auxiliary blades 10 are alternately arranged to further divide the originally continuous and complete screw passage space between the screw blades 6 into a zigzag flow passage 15, thereby prolonging the separation path length of the suspension and effectively improving the separation effect.

The auxiliary blade 10 added in this embodiment is a planar straight blade arranged along the radial direction of the screw conveyor, the bottom side edge of the root is welded to the outer periphery of the inner cylinder 4, and one side edge is welded to the screw blade 6, that is, a part of the left edge of the auxiliary blade 10 in each screw space is fixed with the screw blade 6 near the left side, a first gap 13 is left on the right side, with the width of t, the distance t is 20%-80% of the screw pitch p, and the right edge of the other part of the auxiliary blade 10 is fixed with the right screw blade 6 far from the feed pipe 1, so that a second gap 14 is left on the left side; That is, two adjacent auxiliary blades 10 in each circumferential space are interlaced and fixed with the left screw blades 6 and the right screw blades 6 so as to form a tortuous or serpentine flow passage 15 in each screw space. When the separation liquid flows through the passage, it is blocked by the auxiliary blades 10 to reduce the flow rate and be forced to turn continuously, thereby increasing the residence time of the liquid to be separated in the rotary drum during the centrifugal separation process. In this embodiment, a plurality of auxiliary blades 10 are uniformly arranged radially and equiangularly in a plurality of pitches of the screw conveyor.

When the invention is in operation, the suspended material to be separated enters the inner cylinder 4 of the screw conveyor from the feed pipe 1, and then enters between the outer cylinder 5 and the inner cylinder 4 which rotates at high speed from the discharge hole 3 of the screw conveyor, the solid-phase particles settle on the inner wall of the outer cylinder, the screw conveyor pushes the solid-phase particle sediment to the drying area at the small end of the rotary drum, namely the solid-phase end, and is extruded from the solid-phase outlet 12 of the rotary drum after being further extruded and dehydrated by the thrust force of the screw conveyor and the sediment centrifugal force. However, the separated clear liquid with lighter density moves along the inner cylinder 4 to the liquid phase end on the other side and settles, and is finally discharged from the overflow port 9.

By adding auxiliary blades 10 between the screw blades 6 and rotating along with the inner cylinder 4, the suspension entering the screw conveyor is separated from the liquid phase under the action of a huge centrifugal force field. Due to the existence of the auxiliary blade 10, the original method of only driving the liquid rotation by the screw blade 6 is changed, while the suspension entering between the inner and outer cylinders from the discharge hole 3 is driven by the auxiliary blade 10 so that the centrifugal force and rotation speed can be obtained immediately, and thus to accelerate the separation of the solid and liquid phases and improve the separation efficiency. At the same time, the auxiliary blade 10 also increases the equivalent settling area. According to the formula of separation factor Fr=rω2/g, the above-mentioned increase in speed and area can significantly increase the separation factor Fr and achieve better separation effect.

The staggered auxiliary blades 10 arranged in the screw channel of the invention form a wave-shaped channel to increase the settling distance and residence time of the suspension to be separated in the rotary drum; under the condition that the diameter, rotational speed and length-diameter ratio of the rotary drum are the same, the equivalent settling area is increased, the settling distance of the particles is shortened, and the flow velocity of the suspension is increased at the same time, so that the solid particles can be fully separated from the liquid phase and settled, and the clear liquid with higher purity can be obtained, therefore, the filtration treatment of the solid particles is unnecessary in the latter process. The invention enhances the processing capacity and separation efficiency of the suspension which is difficult to separate from solid and liquid by modifying the existing horizontal screw centrifuge, with the advantages of low cost and saving production operation expenses.

Embodiment 2

Figure 5:
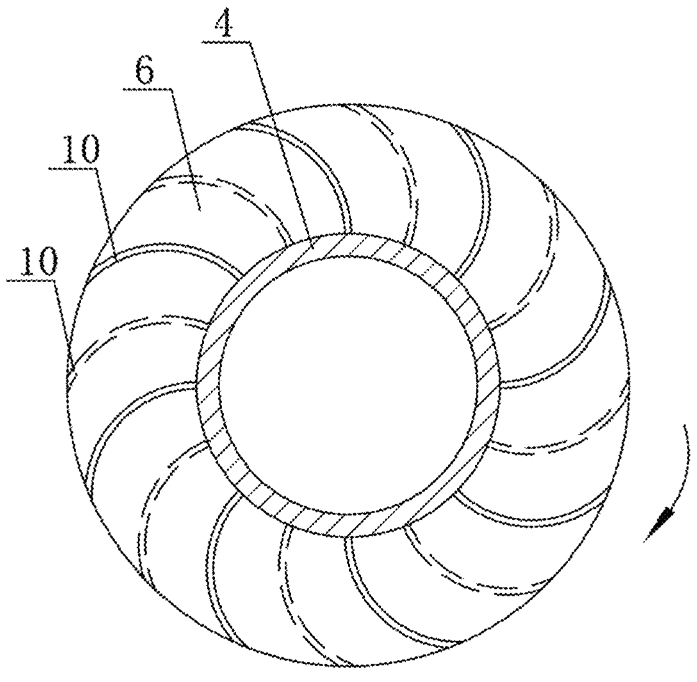
FIG. 5 is the same as FIG. 4 and is a layout view of the auxiliary blade of the screw conveyor in Embodiment 2.

As shown in FIG. 5, this embodiment changes the planar straight blade in Embodiment 1 to a curved blade, and the auxiliary blade 10 has a certain bending arc, and the curved convex direction of the curved surface is consistent with the rotation direction of the rotary drum, that is, the heavy phase particles in the suspension will move outward along the convex surface of the curved blade, so that the centrifugal force can be effectively increased and the heavy phase particles can be easily settled.

Embodiment 3

Figure 6:
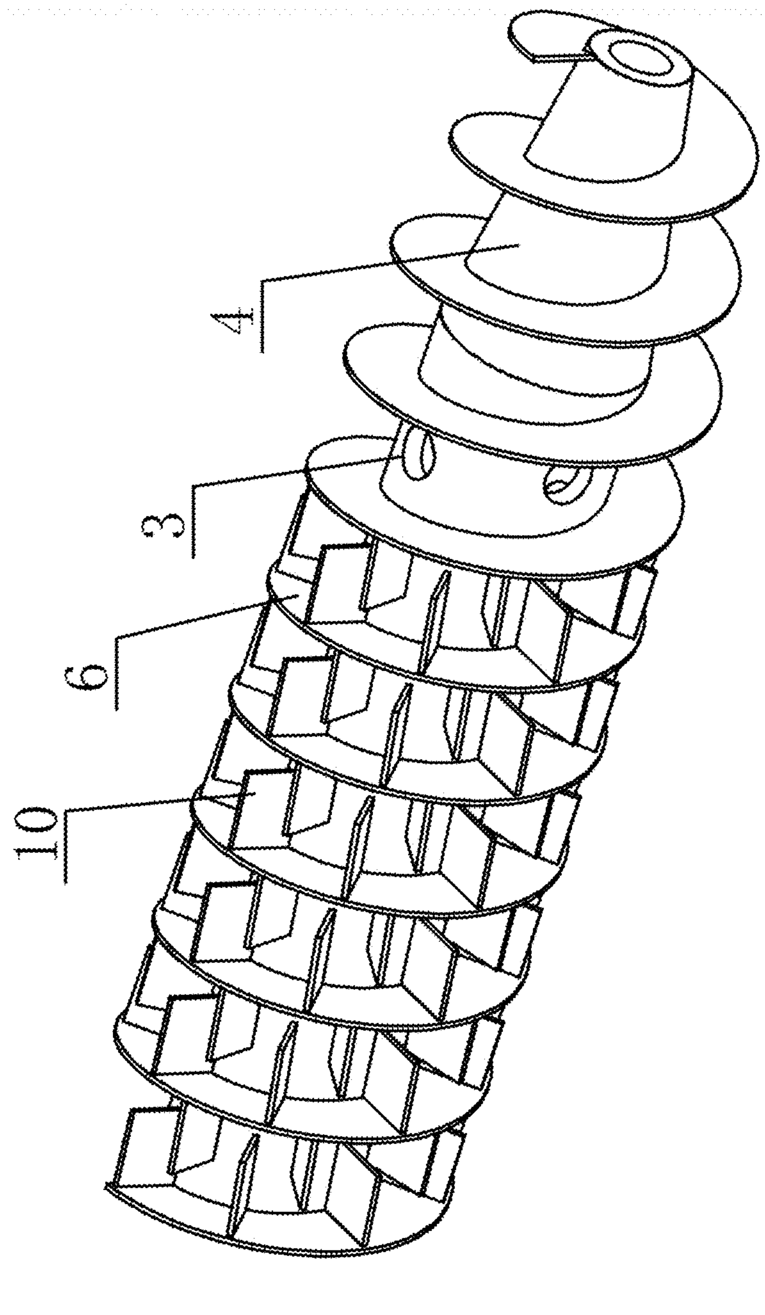
FIG. 6 is a perspective view of a screw conveyor of Embodiment 3 of the present invention.
Figure 7:
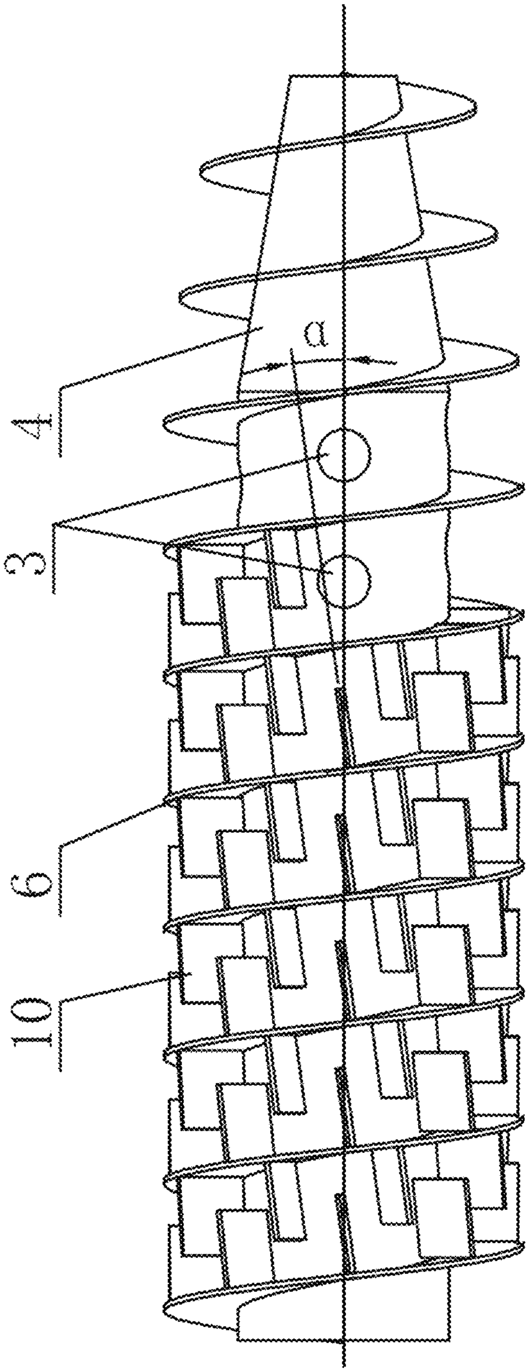
FIG. 7 is a main view of FIG. 6.
Figure 8:
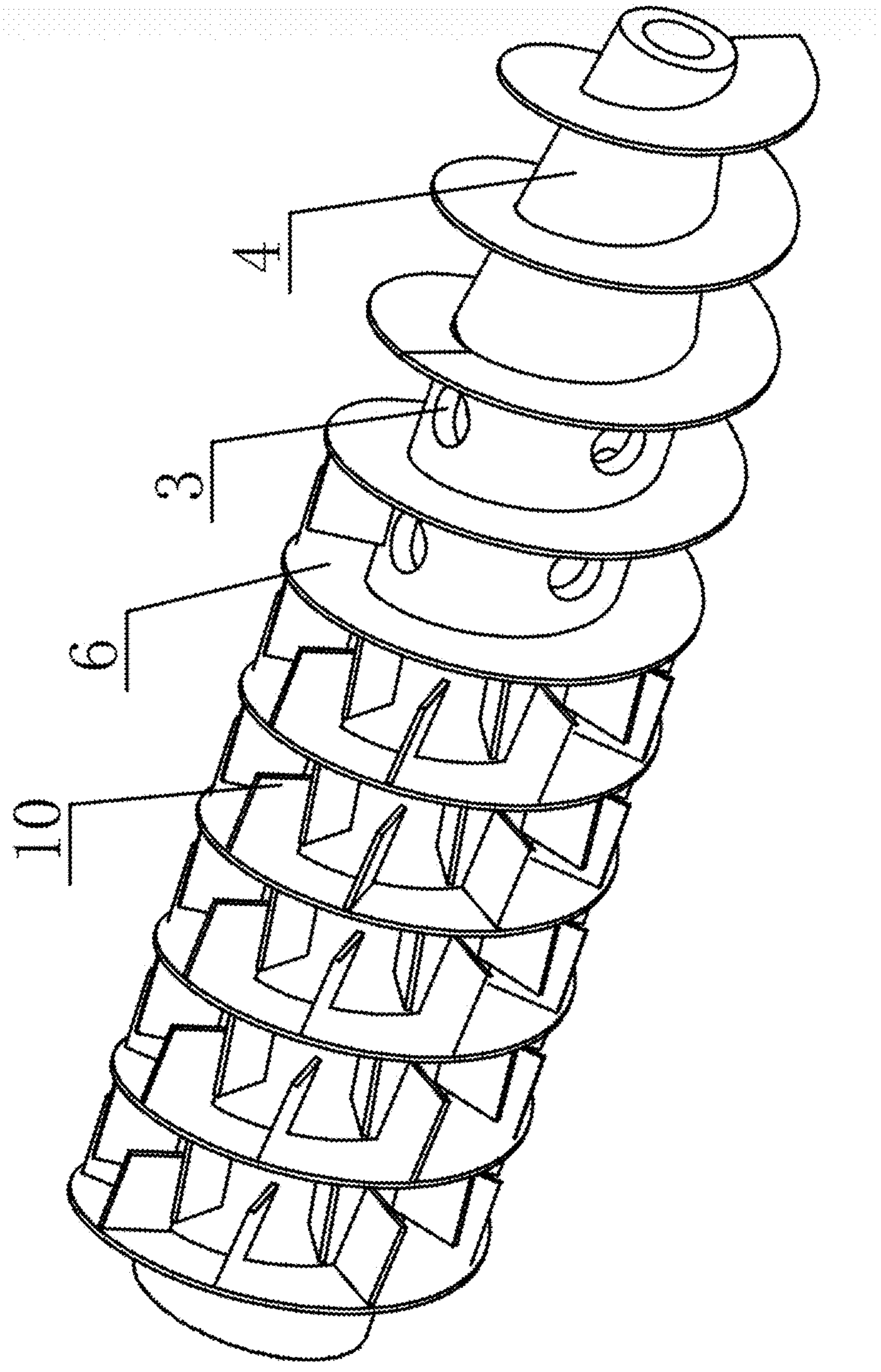
FIG. 8 is a perspective view of a screw conveyor of Embodiment 4 of the present invention.

As shown in FIGS. 6 and 7, this embodiment deflects the auxiliary blade 10 arranged along the axial direction of the rotary drum in Embodiment 1 at a certain angle. In FIG. 7, the included angle α between the auxiliary blade 10 and the central axis of the rotary drum is within 45°, preferably 5 to 30°. Adjacent blades are arranged in parallel, and the deflection direction is the same. In this embodiment, the auxiliary blade 10 is arranged in the screw passage at the rear of the discharge hole 3 to reduce the conveying resistance of the drying zone of the tapered section 11 of the rotary drum and facilitate the discharge of solid-phase materials.

Embodiment 4

Figure 9:
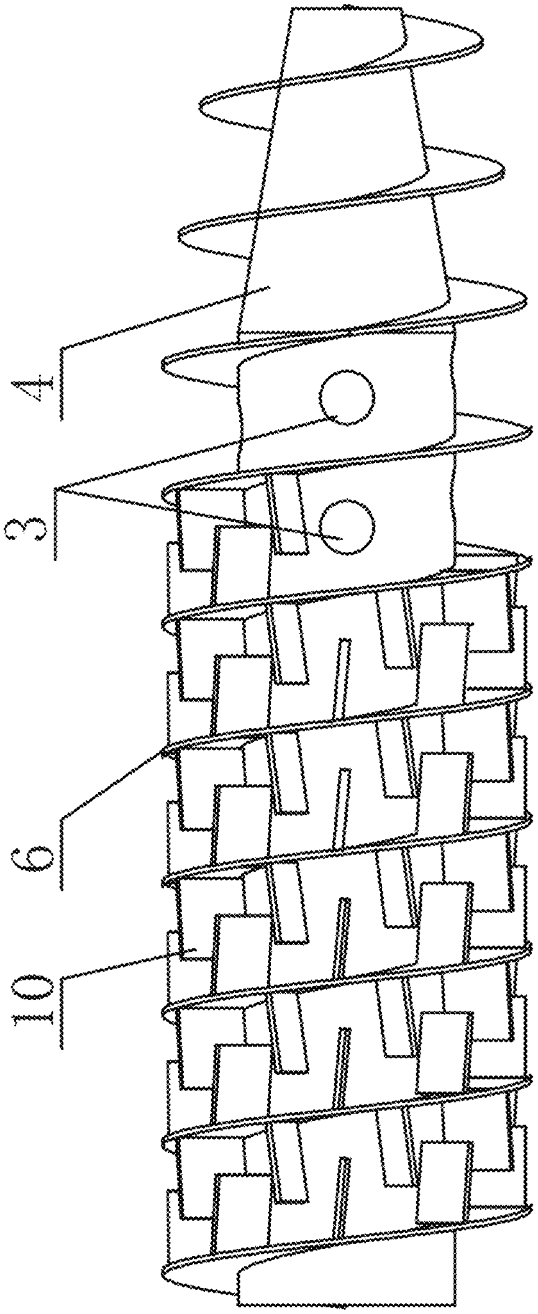
FIG. 9 is a main view of FIG. 6.
Figure 10:
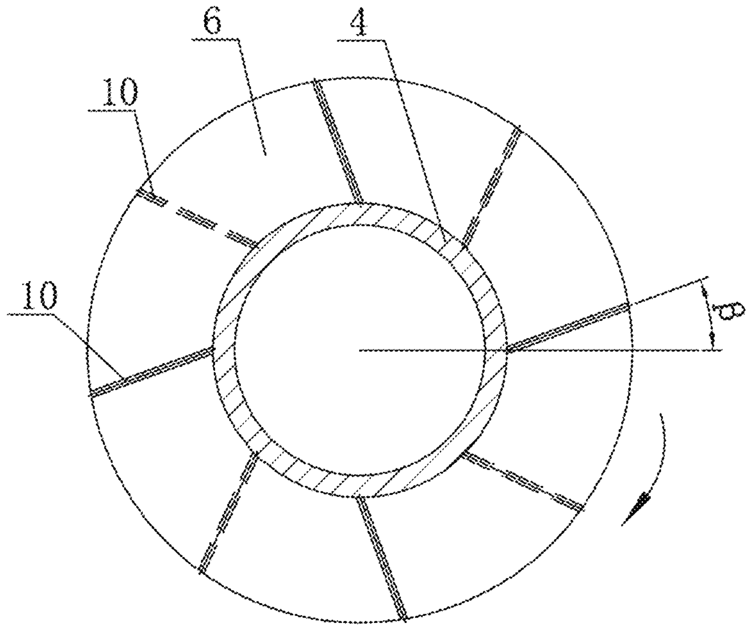
FIG. 10 is the same as FIG. 4 and is a layout view of the auxiliary blade of the screw conveyor in Embodiment 4.

As shown in FIG. 9 and FIG. 10, the deflection directions of the auxiliary blades 10 with the same deflection direction in Embodiment 4 are staggered, that is, the deflection direction of the auxiliary blades 10 welded on one side of the pushing surface of the screw blades 6 is opposite to the rotation direction, and the deflection direction of the auxiliary blades 1 welded on the back side is the same as the rotation direction. The implementation embodiment can improve the efficiency of solid ejecting and avoid the generation of dead angles or accumulation.

Embodiment 5

As shown in FIG. 10, the auxiliary blade 10 arranged along the diameter of the rotary drum in Embodiment 1 is deflected at a certain angle, and the included angle β between the auxiliary blade 10 and the diameter in FIG. 10 is within 90°, preferably 5 to 45°. In this embodiment, four auxiliary blades 10 are provided in a screw pitch.

Embodiment 6

The height of the auxiliary blade 10 in each of the above embodiment is flush with the height of the screw blade 6, and the auxiliary blade 10 can assist in scraping solid particles from the inner wall of the outer drum, and can assist the screw blade 6 in pushing solid particles towards the drying zone at the small end of the drum. Of course, the height of the auxiliary blade 10 may also be lower than that of the screw blade 6 or increase in height from the solid phase end to the liquid phase end to assist the screw blade in pushing solid phase particles to the solid phase end.

The foregoing description is an explanation not a limitation of the invention, and the invention may be modified in any form without departing from the spirit of the invention. For example, the suspension is a kind of solid-liquid mixture, but it can also be fermentation broth, colloid, surfactant or emulsion, etc. For example, the auxiliary blade 10 may also be a circular, conical, curved or other shaped plate with a height not exceeding that of the screw blade 6, and it is only necessary to ensure that the flow passage 15 is formed in each screw circumferential space.

The invention claimed is:

1. A screw conveyer for a decanter centrifuge comprising:

a hollow screw body (4) with a cylindrical section (7) and a conical section (11);

a plurality of discharge openings (3) arranged around a base region of the conical section (11) adjacent to the cylindrical section (7);

a continuous spiral screw blade (6) is configured around an outer surface of the screw body with a preset spiral pitch;

a sequence of auxiliary blades (10) is arranged onto the outer surface of the screw body and in a passage space between turns of the spiral screw blade (6) in a staggered and repeating manner along the passage space, wherein a width of the auxiliary blades is less than that of the preset spiral pitch; and a side edge of an auxiliary blade is anchored onto a location on the spiral screw blade, and a previous or a subsequent auxiliary blade in the passage space is anchored onto an opposing surface of the spiral screw blade across the passage space and spaced from an adjacent auxiliary blade to define a serpentine passage space.

2. The screw conveyor for a decanter centrifuge of claim 1, wherein the auxiliary blades are welded onto the outer surface of the screw body, and said side edge of each auxiliary blade is welded onto the location on the spiral screw blade.

3. The screw conveyor for a decanter centrifuge of claim 2, wherein the width of the auxiliary blade is set in a range of 20% to 80% of the screw pitch.

4. The screw conveyor for a decanter centrifuge of claim 1, wherein the auxiliary blades (10) comprise planar straight blades and/or curved blades.

5. The screw conveyor for a decanter centrifuge of claim 4, wherein the curved auxiliary blades (10) are convex and in a direction consistent with a rotational direction of a rotary drum of the decanter centrifuge.

6. The screw conveyor for a decanter centrifuge of claim 1, wherein an angle $\alpha$ between the auxiliary blades (10) and a central axis of a rotary drum of the decanter centrifuge is within a range of 0 to 45°; and/or an angle $\beta$ between the auxiliary blade (10) and a diameter of the rotary drum is within a range of 0 to 90°.

7. The screw conveyor for a decanter centrifuge of claim 1, wherein the auxiliary blades (10) is are arranged onto the cylindrical section of the screw body.

8. The screw conveyor for a decanter centrifuge of claim 1, wherein a height of the auxiliary blades (10) is less than a height of the spiral screw blade (6), and the height is equal to or the height increases sequentially from a solid phase end to a liquid phase end of the decanter centrifuge.

9. A screw discharge decanter centrifuge, comprising a screw conveyer encased in an outer cylinder (5), wherein the screw conveyer further comprises:

a hollow screw body (4) with a cylindrical section (7) and a conical section (11);

a plurality of discharge openings (3) arranged around a base region of the conical section (11) adjacent to the cylindrical section (7);

a continuous spiral screw blade (6) is configured around an outer surface of the screw body with a preset spiral pitch;

a sequence of auxiliary blades (10) is arranged onto the outer surface of the screw body and in a passage space between turns of the spiral screw blade (6) in a staggered and repeating manner along the passage space, wherein a width of the auxiliary blades is less than that of the preset spiral pitch; and a side edge of an auxiliary blade is anchored onto a location on the spiral screw blade, and a previous or a subsequent auxiliary blade in the passage space is anchored onto an opposing surface of the spiral screw blade across the passage space and spaced from an adjacent auxiliary blade to define a serpentine passage space.

* * * * *